US011990147B2

(12) United States Patent
Ullberg et al.

(10) Patent No.: US 11,990,147 B2
(45) Date of Patent: May 21, 2024

(54) ADAPTIVE TRANSITION FREQUENCY BETWEEN NOISE FILL AND BANDWIDTH EXTENSION

(71) Applicant: Telefonaktiebolaget LM Ericsson (publ), Stockholm (SE)

(72) Inventors: Gustaf Ullberg, Stockholm (SE); Manuel Briand, Djursholm (SE); Anisse Taleb, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 252 days.

(21) Appl. No.: 17/128,665

(22) Filed: Dec. 21, 2020

(65) Prior Publication Data

US 2021/0110836 A1 Apr. 15, 2021

Related U.S. Application Data

(63) Continuation of application No. 16/230,777, filed on Dec. 21, 2018, now Pat. No. 10,878,829, which is a (Continued)

(51) Int. Cl.
*G10L 19/02* (2013.01)
*G10L 19/028* (2013.01)

(Continued)

(52) U.S. Cl.
CPC ........ *G10L 19/028* (2013.01); *G10L 19/0204* (2013.01); *G10L 19/032* (2013.01); *G10L 21/038* (2013.01); *G10L 19/035* (2013.01)

(58) Field of Classification Search
CPC ... G10L 19/02; G10L 19/0204; G10L 19/028; G10L 19/032; G10L 21/038

(Continued)

(56) References Cited

U.S. PATENT DOCUMENTS 5,583,961 A 12/1996 Pawlewski et al.
5,664,057 A * 9/1997 Crossman ............. G10L 19/035 704/229

(Continued)

FOREIGN PATENT DOCUMENTS

WO WO-0045379 A2 * 8/2000 ........... G10L 19/028
WO 02/41302 5/2002

(Continued)

OTHER PUBLICATIONS

Takamizawa et al., "An Efficient Tonal Component Coding Algorithm for MPEG-2 Audio Codec", 1997 IEEE International Conference on Acoustics, Speech, and Signal Processing, Apr. 21, 1997, pp. 331 to 334. (Year: 1997).*

(Continued)

*Primary Examiner* — Martin Lerner

(74) *Attorney, Agent, or Firm* — Rothwell, Figg, Ernst & Manbeck, P.C.

(57) ABSTRACT

A method for spectrum recovery in spectral decoding of an audio signal, comprises obtaining of an initial set of spectral coefficients representing the audio signal, and determining a transition frequency. The transition frequency is adapted to a spectral content of the audio signal. Spectral holes in the initial set of spectral coefficients below the transition frequency are noise filled and the initial set of spectral coefficients are bandwidth extended above the transition frequency. Decoders and encoders being arranged for performing part of or the entire method are also illustrated.

17 Claims, 5 Drawing Sheets

Related U.S. Application Data continuation of application No. 15/639,347, filed on Jun. 30, 2017, now Pat. No. 10,199,049, which is a continuation of application No. 14/955,645, filed on Dec. 1, 2015, now Pat. No. 9,711,154, which is a continuation of application No. 12/674,341, filed as application No. PCT/SE2008/050969 on Aug. 26, 2008, now Pat. No. 9,269,372.

(60) Provisional application No. 60/968,134, filed on Aug. 27, 2007.

(51) Int. Cl.
*G10L 19/032* (2013.01)
*G10L 21/038* (2013.01)
*G10L 19/035* (2013.01)

(58) Field of Classification Search
USPC .......................... 704/201, 205, 206, 500, 501
See application file for complete search history.

(56) References Cited

U.S. PATENT DOCUMENTS

| | | | |
|---|---|---|---|
| 6,226,616 | B1 | 5/2001 | You et al. |
| 6,708,145 | B1 | 3/2004 | Liljeryd et al. |
| 6,895,375 | B2 | 5/2005 | Malah et al. |
| 6,988,066 | B2 | 1/2006 | Malah |
| 7,013,274 | B2 | 3/2006 | Brandman |
| 7,050,972 | B2 | 5/2006 | Henn et al. |
| 7,216,074 | B2 | 5/2007 | Malah et al. |
| 7,330,812 | B2 | 2/2008 | Ding |
| 7,447,631 | B2 | 11/2008 | Truman et al. |
| 7,469,206 | B2 | 12/2008 | Kjörling et al. |
| 7,483,836 | B2 | 1/2009 | Taori et al. |
| 7,548,852 | B2 | 6/2009 | Den Brinker et al. |
| 7,613,604 | B1 | 11/2009 | Malah et al. |
| 7,761,290 | B2 | 7/2010 | Koishida et al. |
| 7,885,819 | B2 | 2/2011 | Koishida et al. |
| RE43,189 | E | 2/2012 | Liljeryd et al. |
| 8,332,216 | B2 | 12/2012 | Kurniawati et al. |
| 8,370,133 | B2 | 2/2013 | Taleb et al. |
| 8,392,202 | B2 | 3/2013 | Taleb |
| 9,111,532 | B2 | 8/2015 | Taleb et al. |
| 9,117,458 | B2 | 8/2015 | Oh et al. |
| 9,269,372 | B2 | 2/2016 | Ullberg et al. |
| 9,495,971 | B2 | 11/2016 | Ullberg et al. |
| 9,711,154 | B2 | 7/2017 | Ullberg et al. |
| 10,199,049 | B2 | 2/2019 | Ullberg et al. |
| 10,878,829 | B2 * | 12/2020 | Ullberg ................. G10L 21/038 |
| 2002/0103637 | A1 | 8/2002 | Henn et al. |
| 2003/0009327 | A1 | 1/2003 | Nilsson et al. |
| 2003/0061055 | A1 | 3/2003 | Taori et al. |
| 2003/0093271 | A1 * | 5/2003 | Tsushima .............. G10L 21/038 704/230 |
| 2003/0093278 | A1 | 5/2003 | Malah |
| 2003/0093279 | A1 | 5/2003 | Malah et al. |
| 2003/0158726 | A1 | 8/2003 | Philippe et al. |
| 2003/0187663 | A1 * | 10/2003 | Truman ................ G10L 19/173 704/500 |
| 2003/0233234 | A1 | 12/2003 | Truman et al. |
| 2004/0028244 | A1 | 2/2004 | Tsushima et al. |
| 2005/0096917 | A1 | 5/2005 | Kjörling et al. |
| 2005/0187759 | A1 | 8/2005 | Malah et al. |
| 2005/0231396 | A1 | 10/2005 | Dunn |
| 2006/0217975 | A1 | 9/2006 | Sung et al. |
| 2006/0241940 | A1 | 10/2006 | Ramprashad |
| 2006/0265087 | A1 | 11/2006 | Philippe et al. |
| 2007/0033023 | A1 | 2/2007 | Sung et al. |
| 2007/0162277 | A1 | 7/2007 | Kurniawati et al. |
| 2007/0276661 | A1 | 11/2007 | Dimkovic et al. |
| 2007/0282599 | A1 | 12/2007 | Choo et al. |
| 2008/0027711 | A1 * | 1/2008 | Rajendran ............. G10L 19/167 704/201 |
| 2008/0082327 | A1 | 4/2008 | Murase et al. |
| 2008/0109215 | A1 | 5/2008 | Liu et al. |
| 2008/0208575 | A1 | 8/2008 | Laaksonen et al. |
| 2009/0182563 | A1 | 7/2009 | Schobben et al. |
| 2010/0241437 | A1 | 9/2010 | Taleb et al. |
| 2011/0196684 | A1 | 8/2011 | Koishida et al. |
| 2013/0013321 | A1 | 1/2013 | Oh et al. |
| 2013/0218577 | A1 | 8/2013 | Taleb et al. |

FOREIGN PATENT DOCUMENTS

| | | | |
|---|---|---|---|
| WO | 2005/078706 | 8/2005 | |
| WO | WO-2009029037 A1 * | 3/2009 | ......... G10L 19/0204 |

OTHER PUBLICATIONS

Taleb et al., "Partial Spectral Loss Concealment in Transform Coders", IEEE International Conference on Acoustics, Speech, and Signal Processing 2005, Proceedings (ICASSP '05), Mar. 18-23, 2005, vol. 3, pp. III-185 to III-188.

Spectral Band Replication, Wikipedia, 2 Pages, printed Dec. 2, 2014.

"3rd Generation Partnership Project; Technical Specification Group Services and System Aspects; General audio codec audio processing functions; Enhanced aacPlus general audio codec; Enhanced aacPlus encoder SBR part (Release 6)", 3GPP TS 26.404 V6.0.0 (Sep. 2004), 34 pages.

Johnston, J.D., "Estimation of Perceptual Entropy Using Noise Masking Criteria", Proc. ICASSP, May 1988, pp. 2524-2527.

Brazilian Office Action dated Aug. 1, 2019 issued in Brazilian Patent Application No. PI0815972-6. (4 pages).

* cited by examiner

ADAPTIVE TRANSITION FREQUENCY BETWEEN NOISE FILL AND BANDWIDTH EXTENSION

CROSS REFERENCE TO RELATED APPLICATIONS

This application is a continuation of U.S. patent application Ser. No. 16/230,777, filed on Dec. 21, 2018 (now U.S. Pat. No. 10,878,829, issued on Dec. 29, 2020), which is a continuation of U.S. application Ser. No. 15/639,347, filed on Jun. 30, 2017 (now U.S. Pat. No. 10,199,049, issued on Feb. 5, 2019), which is a continuation of U.S. application Ser. No. 14/955,645, filed on Dec. 1, 2015 (now U.S. Pat. No. 9,711,154, issued on Jul. 18, 2017), which is a continuation of U.S. application Ser. No. 12/674,341, having a 35 U.S.C. § 371 date of Jul. 14, 2011 (now U.S. Pat. No. 9,269,372, issued on Feb. 23, 2016), which is a 35 U.S.C. § 371 National Phase Application from PCT/SE2008/050969, filed Aug. 26, 2008, and designating the United States, which claims priority to provisional application No. 60/968,134, filed Aug. 27, 2007. The above identified applications and patents are incorporated by reference.

TECHNICAL FIELD

The present invention relates in general to methods and devices for coding and decoding of audio signals, and in particular to methods and devices for spectrum filling.

BACKGROUND

When audio signals are to be stored and/or transmitted, a standard approach today is to code the audio signals into a digital representation according to different schemes. In order to save storage and/or transmission capacity, it is a general wish to reduce the size of the digital representation needed to allow reconstruction of the audio signals with sufficient quality. The trade-off between size of the coded signal and signal quality depends on the actual application.

Transform based audio coders compress audio signals by quantizing the transform coefficients. For enabling low bitrates, quantizers might concentrate the available bits on the most energetic and perceptually relevant coefficients and transmit only those, leaving "spectral holes" of unquantized coefficients in the frequency spectrum.

The so-called SBR (Spectral Band Replication) technology, see e.g. 3GPP TS 26.404 V6.0.0 (2004-09), "Enhanced aacPlus general audio codec—encoder SBR part (Release 6)", 2004 [1], closes the gap between the band-limited signal of a conventional perceptual coder and the audible bandwidth of approximately 15 kHz. The general idea behind SBR is to recreate the missing high frequency contents of a decoded signal in a perceptually accurate manner. The frequencies above 15 kHz are less important from a psychoacoustic point of view, but may also be reconstructed. However, SBR cannot be used as a standalone codec. It always operates, in conjunction with a conventional waveform codec, a so-called core codec. The core codec is responsible for transmitting the lower part of the original spectrum while the SBR-decoder, which is mainly a post-process to the conventional waveform decoder, reconstructs the non-transmitted frequency range. The spectral values of the high band are not transmitted directly as in conventional codecs. The combined system offers a coding gain superior to the gain of the core codec alone.

The SBR methodology relies on the definition of a fixed transition frequency between a low band, encoded perceptually relevant low frequencies, and a high band, not encoded less relevant high frequencies. However, in practice, this transition frequency relies on the audio content of the original signal. In other words, from one signal to another, the appropriate transition frequency can vary a lot. This is for instance the case when comparing clean speech and full-band music signals.

The "spectral holes" of the decoded spectrum can be divided in two kinds. The first one is small holes at lower frequencies due to the effect of instantaneous masking, see e.g. J. D. Johnston, "Estimation of Perceptual Entropy Using Noise Masking Criteria", Proc. ICASSP, pp. 2524-2527, May 1988[2]. The second one is larger holes at high frequencies resulting from the saturation by the absolute threshold of hearing and the addition of masking [2]. The SBR mainly concerns the second kind.

Moreover, a typical audio codec based on such method which aims at filling the "spectral hole", i.e. not encoded coefficients, for the high frequencies, i.e. the second kind of "spectral holes", should preferably be able to fill the spectral holes over the whole spectrum. Indeed, even if a SBR codec is able to deliver a full bandwidth audio signal, the reconstructed high frequencies will not mask the annoying artefacts introduced by the coding, i.e. quantization, of the low band, i.e. the perceptually relevant low frequencies.

SUMMARY

A general object of the present invention is to provide methods and devices for enabling efficient suppression of perceptual artefacts caused by spectral holes over a fullband audio signal.

The above objects are achieved by methods and devices according to the enclosed patent claims. In general words, according to a first aspect, a method for spectrum recovery in spectral decoding of an audio signal, comprises obtaining of an initial set of spectral coefficients representing the audio signal, and determining a transition frequency. The transition frequency is adapted to a spectral content of the audio signal. Spectral holes in the initial set of spectral coefficients below the transition frequency are noise filled and the initial set of spectral coefficients are bandwidth extended above the transition frequency.

According to a second aspect, a method for use in spectral coding of an audio signal comprises determining of a transition frequency for an initial set of spectral coefficients representing the audio signal. The transition frequency is adapted to a spectral content of the audio signal. The transition frequency defines a border between a frequency range, intended to be a subject for noise filling of spectral holes, and a frequency range, intended to be a subject for bandwidth extension.

According to a third aspect, a decoder for spectral decoding of an audio signal comprises an input for obtaining an initial set of spectral coefficients representing the audio signal and transition determining circuitry arranged for determining a transition frequency. The transition frequency is adapted to a spectral content of the audio signal. The decoder comprises a noise filler for noise filling of spectral holes in the initial set of spectral coefficients below the transition frequency and a bandwidth extender arranged for bandwidth extending the initial set of spectral coefficients above the transition frequency.

According to a fourth aspect, an encoder for spectral coding of an audio signal comprises transition determining circuitry arranged for determining a transition frequency for an initial set of spectral coefficients representing the audio signal. The transition frequency is adapted to a spectral content of the audio signal. The transition frequency defines a border between a frequency range, intended to be a subject for noise filling of spectral holes, and a frequency range, intended to be a subject for bandwidth extension.

The present invention has a number of advantages. One advantage is that a use of the transition frequency allows the use of a combined spectrum filling using both noise filling and bandwidth extension. Furthermore, the transition frequency is defined adaptively, e.g. according to the coding scheme used, which makes the spectrum filling dependent on e.g. frequency resolution. Any speech and or audio codec using this method is able to deliver a high-quality, i.e. with reduced annoying artefacts, and full bandwidth audio signal. The method is flexible in the sense it can be combined with any kind of frequency representation (DCT, MDCT, etc.) or filter banks, i.e. with any codec (perceptual, parametric, etc.).

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
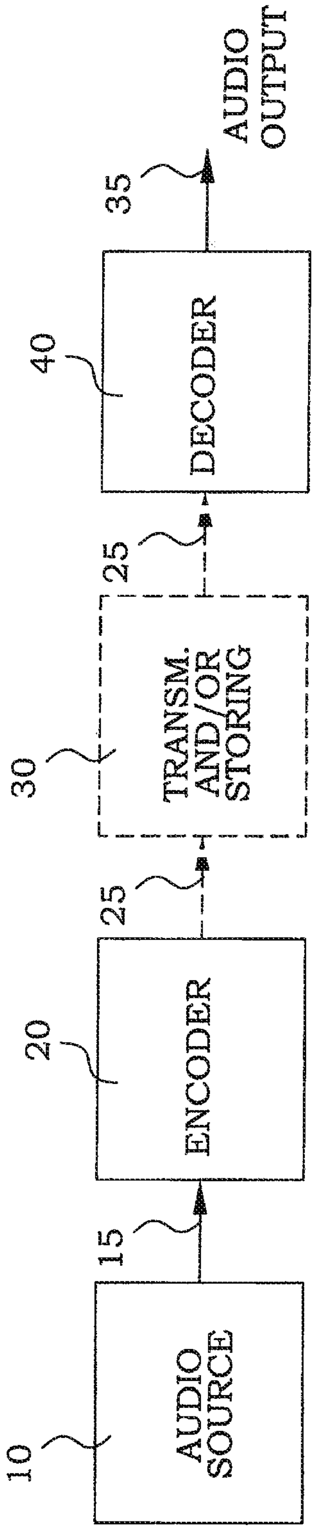
FIG. 1 is a schematic block scheme of a codec system.

An embodiment of a general codec system for audio signals is schematically illustrated in FIG. 1. An audio source 10 gives rise to an audio signal 15. The audio signal 15 is handled in an encoder 20, which produces a binary flux 25 comprising data representing the audio signal 15. The binary flux 25 may be transmitted, as e.g. in the case of multimedia communication, by a transmission and/or storing arrangement 30. The transmission and/or storing arrangement 30 optionally also may comprise some storing capacity. The binary flux 25 may also only be stored in the transmission and/or storing arrangement 30, just introducing a time delay in the utilization of the binary flux. The transmission and/or storing arrangement 30 is thus an arrangement introducing at least one of a spatial repositioning or time delay of the binary flux 25. When being used, the binary flux 25 is handled in a decoder 40, which produces an audio output 35 from the data comprised in the binary flux. Typically, the audio output 35 should resemble the original audio signal 15 as well as possible under certain constraints.

In many real-time applications, the time delay between the production of the original audio signal 15 and the produced audio output 35 is typically not allowed to exceed a certain time. If the transmission resources at the same time are limited, the available bit-rate is also typically low. In order to utilize the available bit-rate in a best possible manner, perceptual audio coding has been developed. Perceptual audio coding has therefore become an important part for many multimedia services today. The basic principle is to convert the audio signal into spectral coefficients in a frequency domain and using a perceptual model to determine a frequency and time dependent masking of the spectral coefficients.

Figure 2:
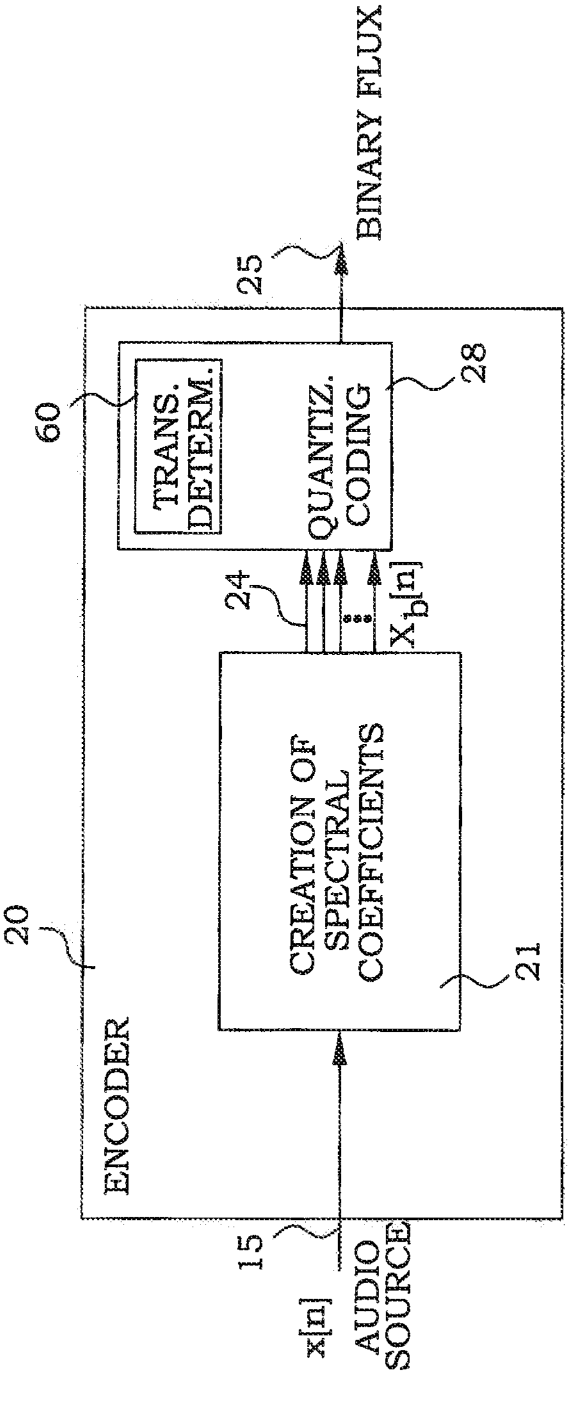
FIG. 2 is a schematic block scheme of an embodiment of an audio signal encoder according to the present invention.

FIG. 2 illustrates an embodiment of an audio encoder 20 according to the present invention. In this particular embodiment, the perceptual audio encoder 20 is a spectral encoder based on a perceptual transformer or a perceptual filter bank. An audio source 15 is received, comprising frames of audio signals x[n].

In a typical spectral encoder, a converter 21 is arranged for converting the time domain audio signal 15 into a set 24 of spectral coefficients $X_b[n]$ of a frequency domain. In a typical transform encoder, the conversion can e.g. be performed by a Discrete Fourier Transform (DFT), a Discrete Cosine Transform (DCT) or a Modified Discrete Cosine Transform (MDCT). The converter 21 may thereby typically be constituted by a spectral transformer. The details of the actual transform are of no particular importance for the basic ideas of the present invention and are therefore not further discussed.

The set 24 of spectral coefficients, i.e. a frequency representation of the input audio signal is provided to a quantizing and coding section 28, where the spectral coefficients are quantized and coded. Typically, the quantization is operating to concentrate the available bits on the most energetic and perceptually relevant coefficients. This may be performed using e.g. different kinds of masking thresholds or bandwidth reductions. The result will typically be "spectral holes" of unquantized coefficients in the frequency spectrum. In other words, some of the coefficients are left out on purpose, since they are perceptually less important, for not occupying transmission resources better needed for other purposes. Such spectral holes may then by different reconstructing strategies be corrected or reconstructed at the decoder side. Typically, spectral holes of two kinds appear. The first kind comprises spectral holes, single ones or a few neighbouring ones which occur at different places mainly in the low frequency region. The second type is a more or less continuous group of spectral holes at the high-frequency end of the spectrum.

According to the present invention, it is favourable to treat these two different kinds of spectral holes in different ways, in order to achieve an as efficient spectrum filling as possible. One parameter to determine is then a transition frequency, at which the different fill approaches meet, a so called transition frequency. Since the distribution of spectral holes differs between different kinds of audio signals, the optimum choice of transition frequency also differ. According to the present invention, the transition frequency is adapted to a spectral content of the audio signal. Typically, the transition frequency is adapted to a spectral content of a present frame of the audio signal, however, the transition frequency may also depend on spectral contents of previous frames of the audio signal, and if there are no serious delay requirements, the transition frequency may also depend on spectral contents of future frames of the audio signal. This adaptation can be performed at the encoder side by a transition determining circuitry 60, typically integrated with the quantizing and coding section 28. However, in alternative embodiments, the transition determining circuitry 60 can be provided as a separately operating section, whereby only a parameter representing the transition frequency is provided to the different functionalities of the encoder 20. The transition frequency can be used at the encoder side e.g. for providing an appropriate envelope coding for the frequency intervals at the different sides of the transition frequency.

The quantizing and coding section 28 is further arranged for packing the coded spectral coefficients together with additional side information into a bitstream according to the transmission or storage standard that is going to be used. A binary flux 25 having data representing the set of spectral coefficients is thereby outputted from the quantizing and coding section 28. Since the transition frequency is derivable directly from the spectral content of the audio signal, the same derivation can be performed on both sides of the transmission interface, i.e. both at the encoder and, the decoder. This means that the value of the transition frequency itself not necessarily has to be transmitted among the additional side information. However, it is of course also possible to do that if there is available bit-rate capacity.

In a particular embodiment, a MDCT transform is used. After the weighting performed by a psycho acoustic model, the MDCT coefficients are quantized using vector quantization. In vector quantization, VQ, the spectral coefficients are divided into small groups. Each group of coefficients can be seen as a single vector, and each vector is quantized individually.

Figure 3:
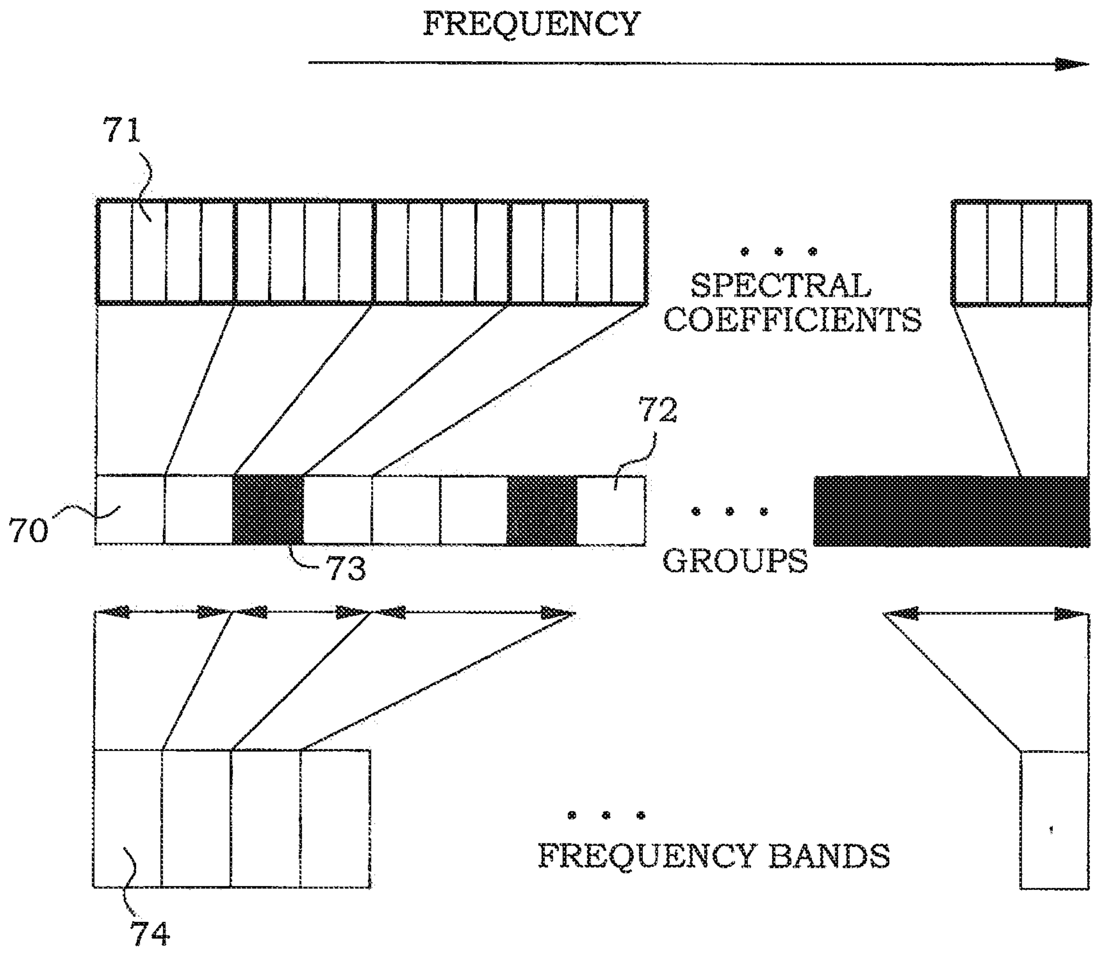
FIG. 3 is a schematic illustration of spectral coefficients, groups thereof and frequency bands.

For instance, due to high restrictions on the bit rate, the quantizer may focus the available bits on the most energetic and perceptually relevant groups, resulting in that some groups are set to zero. These groups form spectral holes in the quantized spectrum. This is illustrated in FIG. 3. In the present embodiment, the groups 70 comprise the same number of spectral coefficients 71, in this case four. However, in alternative embodiments groups having different number of spectral coefficients may also be possible. In one particular embodiment, all groups comprise only one spectral coefficient each, i.e. the group is the same as the spectral coefficient itself. Quantized groups 72 are illustrated in the figure by unfilled rectangles, while groups set to zero 73 are illustrated as black rectangles. It is typically only the quantized groups 72 that are transmitted to any end user.

The groups 70 of coefficients are in turn divided into different frequency bands 74. This division is preferably performed according to some psycho acoustical criterion. Groups having essentially similar psycho acoustical properties may thereby be treated collectively. The number of members of each frequency band 74, i.e. the number of groups 70 associated with the frequency bands 74 may therefore differ. If large frequency portions have similar properties, a frequency band covering these frequencies may have a large frequency range. If the psycho acoustic properties change fast over frequencies, this instead calls for frequency bands of a small frequency range. The routines for spectrum fill may preferably depend on the frequency band to be filled, as discussed more in detail further below.

Figure 4:
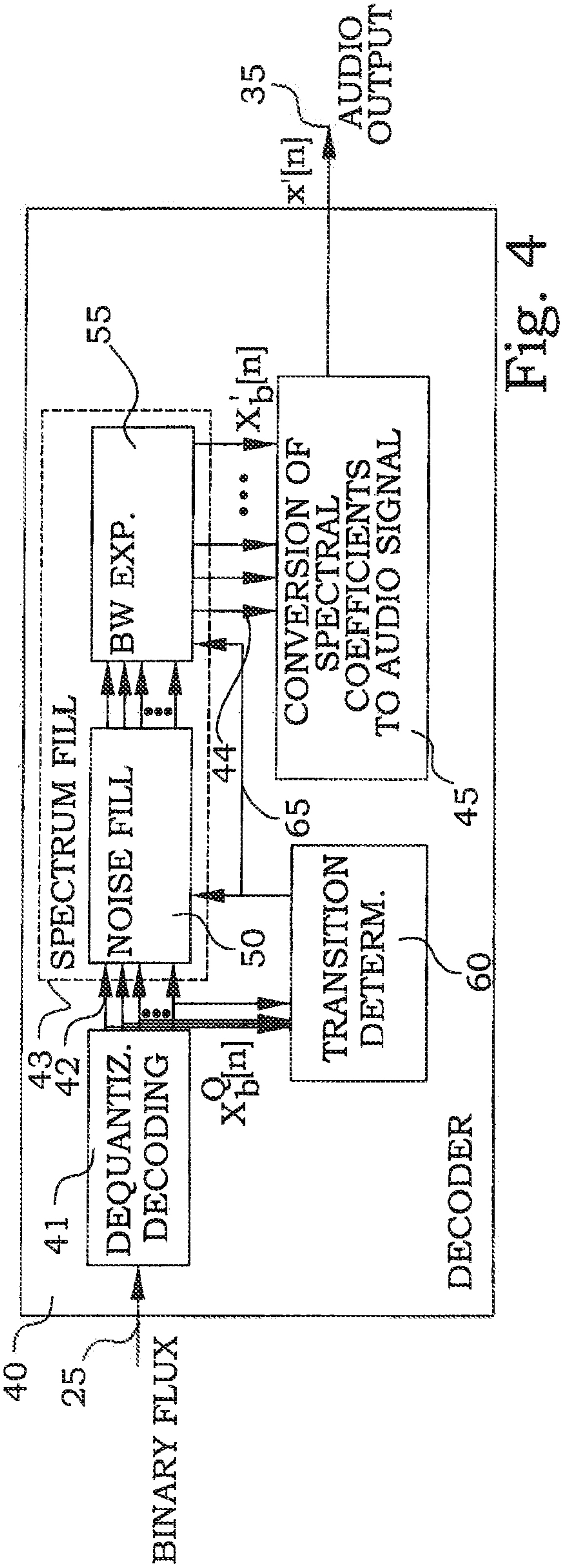
FIG. 4 is a schematic block scheme of an embodiment of an audio signal decoder according to the present invention.

At the decoding stage, the inverse operation is basically achieved. In FIG. 4, an embodiment of an audio decoder 40 according to the present invention is illustrated. A binary flux 25 is received, which has properties caused by the encoder described here above. De-quantization and decoding of the received binary flux 25 e.g. a bitstream is performed in a spectral coefficient decoder 41. The spectral coefficient decoder 41 is arranged for decoding spectral coefficients recovered from the binary flux into decoded spectral coefficients $X^Q[n]$ of an initial set of spectral coefficients 42, possibly grouped in frequency groups $X_b^Q[n]$. The initial set of spectral coefficients 42 preferably resembles the set of spectral coefficients provided by the converter of the encoder side, possibly after postprocessing such as e.g. masking thresholds or bandwidth reductions.

As discussed further above, the application of masking thresholds or bandwidth reductions at the encoder typically results in that the set of spectral coefficients 42 is incomplete in that sense that it typically comprises so-called "spectral holes". "Spectral holes" correspond to spectral coefficients that are not received in the binary flux. In other words, the spectral holes are undefined or noncoded spectral coefficients $X^Q[n]$ or spectral coefficients automatically set to a predetermined value, typically zero, by the spectral coefficient decoder 41. To avoid audible artefacts, these coefficients have to be replaced by estimates (filled) at the decoder.

The spectral holes often come in two types. Small spectral holes are typically at the low frequencies, and one or a few big spectral holes typically occur at the high frequencies.

To minimize artefacts in the decoded audio signal, the decoder "fills" the spectrum by replacing the spectral holes in the spectrum with estimates of the coefficients. These estimates may be based on side-information transmitted by the decoder and/or may be dependent on the signal itself. Examples of such useful side-information could be the power envelope of the spectrum and the tonality, i.e. spectral-flatness measure, of the missing coefficients.

Two different methods can be used to fill the different kinds of spectral holes. "Noise fill" works well for spectral holes in the lower frequencies, while "bandwidth extension" is more suitable at high frequencies. The present invention describes a method to decide where noise fill and bandwidth extension should be used, respectively.

The present invention relies on the definition of a transition frequency between low and high relevant parts of the spectrum. Based on this information, a typical coding algorithm relying on a high-quality "noise fill" procedure will be able to reduce coding artefacts occurring for low rates and also to regenerate a full bandwidth audio signal even at low rates and with a low complexity scheme based on "bandwidth extension". This will be discussed more in detail further below.

The initial set of spectral coefficients 42 from the spectral coefficient decoder 41, typically comprising a certain amount of spectral holes, is provided to a transition determining circuitry 60. The transition determining circuitry 60 is arranged for determining a transition frequency $f_t$.

The initial set of spectral coefficients 42 from the spectral coefficient decoder 41 is also provided to a spectrum filler 43. The spectrum filler 43 is arranged for spectrum filling the initial set of spectral coefficients 42, giving rise to a complete set 44 of reconstructed spectral coefficients $X_b'[n]$. The set 44 of reconstructed spectral coefficients have typically all spectral coefficients within a certain frequency range defined.

The spectrum filler 43 in turn comprises a noise filler 50. The noise filler 50 is arranged for providing a process for noise filling of spectral holes, preferably in the low-frequency region, i.e. below the transition frequency $f_t$. A value is thereby assigned to spectral coefficients in the initial set of spectral coefficients below the transition frequency that are "missing", as a result of not being included in the received coded bitstream. To this end, an output 65 from the transition determining circuitry 60 is connected to the noise filler 50, providing information associated with the transition frequency $f_t$.

The spectrum filler 43 also comprises a bandwidth extender 55, arranged for bandwidth extending the initial set of spectral coefficients above the transition frequency in order to produce the set 44 of reconstructed spectral coefficients. Therefore, the output 65 from the transition determining circuitry 60 is also connected to the bandwidth extender 55.

As mentioned above, the result from the spectrum filler 43 is a complete set 44 of reconstructed spectral coefficients $X_b'[n]$, having all spectral coefficients within a certain frequency range defined.

The set 44 of reconstructed spectral coefficients is provided to a converter 45 connected to the spectrum filler 43. The converter 45 is arranged for converting the set 44 of spectral coefficients of a frequency domain into an audio signal of a time domain. The converter 45 is in the present embodiment based on a perceptual transformer, corresponding to the transformation technique used in the encoder 20 (FIG. 2). In a particular embodiment, the signal is provided back into the time domain with an inverse transform, e.g. Inverse MDCT-IMDCT or Inverse DFT-IDFT, etc. In other embodiments an inverse filter bank may be utilized. As at the encoder side, the technique of the converter 45 as such, is known in prior art, and will not be further discussed. A final perceptually reconstructed audio signal x'[n] is provided at an output 35 for the audio signal, possibly with further treatment steps.

The codec must decide in what frequency bands to use noise fill and in what frequency bands to use bandwidth extension. Noise fill gives the best result when most of the groups of the frequency band to be filled are quantized, and there are only minor spectral holes in the band. Bandwidth extension is preferable when a large part of the signal in the high frequencies is left unquantized.

One basic method would be to set a fixed transition frequency between the noise fill and bandwidth extension. Spectral holes in the frequency bands or groups under that frequency are filled by noise fill and spectral holes in groups or frequency bands, over that frequency are filled by bandwidth extension.

A problem with this approach is, however, that the optimal transition frequency is not the same for all audio signals. Some signals have most of the energy concentrated in the low frequencies and a big part of the signal could be subject to bandwidth extension. Other signals have their energy more evenly spread over the spectrum and these signals may benefit from using only noise fill.

Figure 5A:
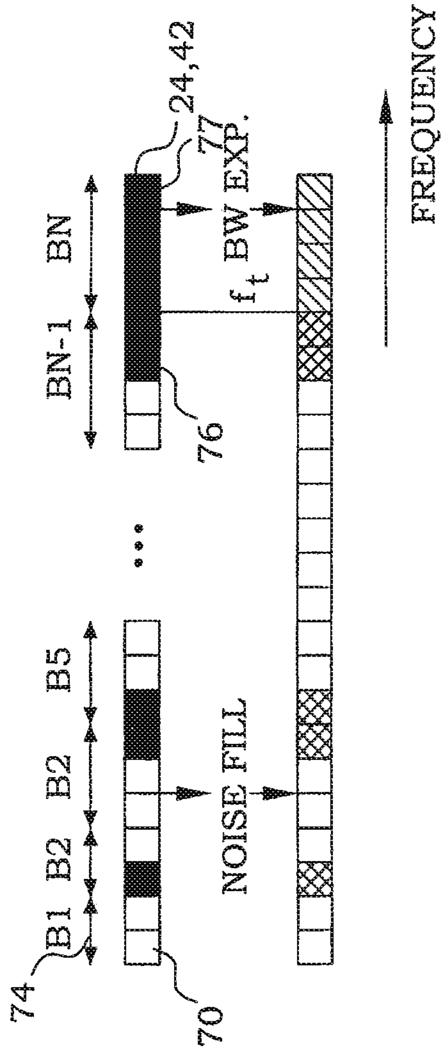
FIGS. 5A-C are illustrations of embodiments of principles for finding a transition frequency.

According to one embodiment of a method according to the present invention the transition frequency is adaptively dependent on a distribution of spectral holes in said initial set of spectral coefficients. A routine for finding a proper transition frequency could be to go through all the frequency bands, starting at the highest (BN) down to 1. If there are no quantized coefficients in the current band, it will be filled by bandwidth extension. If there are quantized coefficients in the band, the holes of this band as well as the following bands are filled using noise fill. Thus a transition frequency is set at the upper limit of the first frequency band seen from the high-frequency side that has a quantized coefficient in it. This is illustrated in FIG. 5A. The spectral holes 77 in band N, i.e. above the transition frequency $f_t$ are thus filled with bandwidth extension approaches. The spectral holes 76 below the transition frequency $f_t$ are instead filled by noise filling.

Figure 5B:
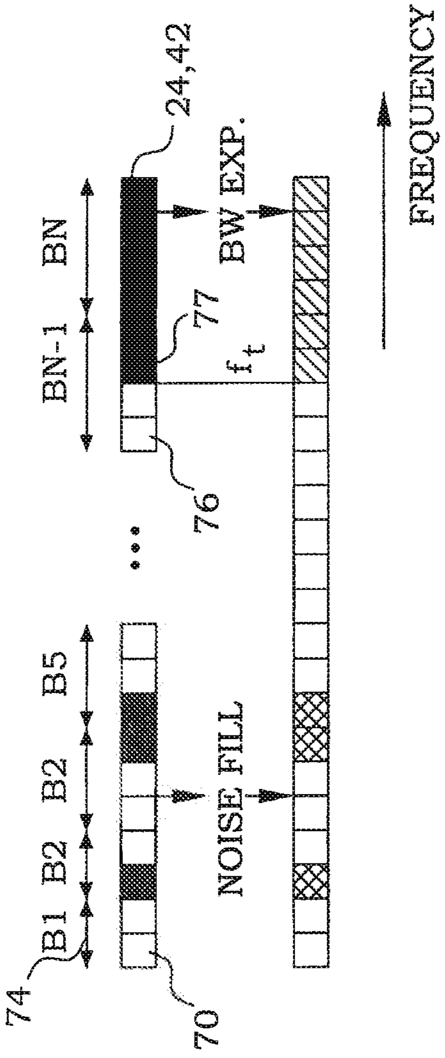

An alternative embodiment is illustrated in FIG. 5B. Here the definition of the transition frequency is based directly on the groups 70, neglecting the frequency band division. Here, bandwidth extension is used for all groups from the highest frequencies down to the group immediately above the first quantized group 78. The spectral holes 76 below the transition frequency $t_r$ are instead filled by noise filling.

Figure 5C:
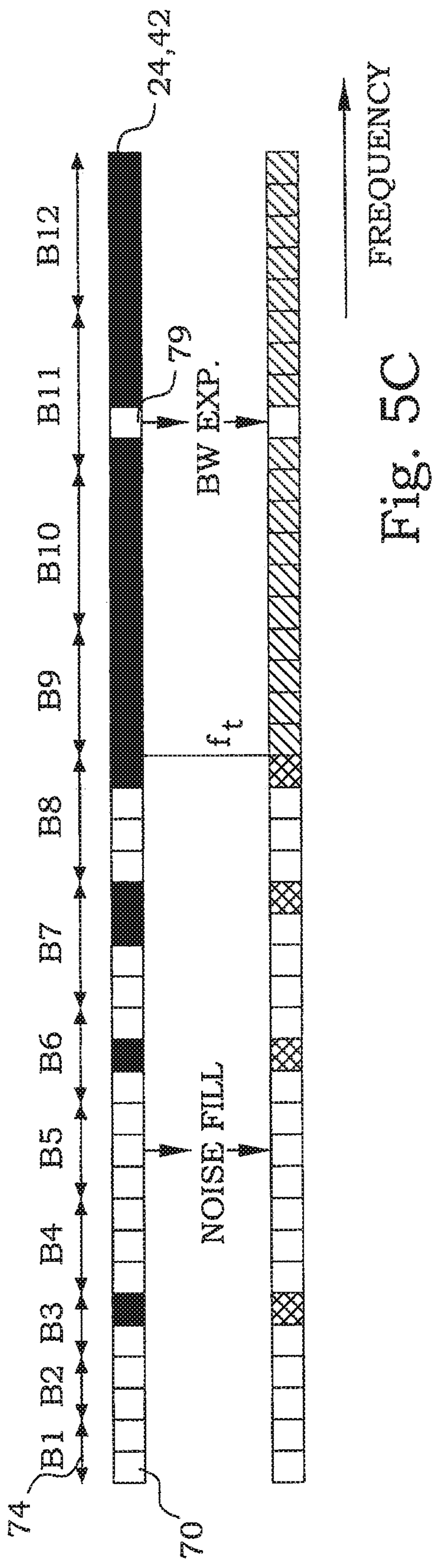

These methods are more adaptive to the audio signal and the quantizer, i.e. the coding scheme, but it may experience minor problems when the signal is quantized e.g. according to FIG. 5C. Here, a big part of the high frequencies of the signal is set to zero, and bandwidth extension should preferably be used from band B9 to B12. However, since there is a single coded quantized group 79 in frequency band B11, bandwidth extension will be completely disabled below this quantized group 79 and noise fill will be used at all bands up to this group 79.

To avoid also this problem, another embodiment is also proposed, where the transition frequency $f_t$ is selected dependent on a proportion of spectral holes in the frequency bands. Like in the previous embodiments, the codec goes through the frequency bands, starting at the highest down to 1. For each frequency band, the number of coded spectral coefficients or groups is counted. If the number of quantized coefficients or groups divided by the total number of spectral coefficients or groups, i.e. the proportion of coded spectral coefficients, of the frequency band exceeds a certain threshold, the spectral holes of that frequency band and the following frequency bands are filled with noise fill. Otherwise bandwidth extension is used. Analogously, one may monitor the proportion of spectral holes in the frequency bands. In other words, a transition frequency band is to be found, which is a highest frequency band in which a proportion of spectral holes is lower than a first threshold.

There are also alternative criteria to select the transition frequency band. One possibility is to let the threshold itself depend on the frequency. In such a way, a certain proportion of spectral holes may be accepted in the high frequency parts for still using bandwidth expansion techniques, but not in the low frequency parts. Anyone skilled in the art realizes that the details in selecting appropriate criteria can be varied in many ways, e.g. being dependent on other signal related properties or other side information.

In one embodiment, the transition frequency is set dependent on, and preferably equal to, an upper frequency limit of the transition frequency band. However, there are also various alternatives. One alternative is to search for the highest frequency coded spectral coefficient or group and setting the transition frequency at the high frequency side of that group.

The algorithm of the embodiment described above can also be described with the following pseudo code:

```
For currentBand = N to 1
    ratio = numCodedCoeffInBand(currentBand) /
    numCoeffInBand(currentBand)
    If ratio > threshold
        Transition is between currentBand and currentBand + 1
        Return
    End if
Next
Transition is at the start of band 1
```

It is preferred if the transition frequency does not vary too much between consecutive frames. Too large changes can be perceived as disturbing. Therefore, in an exemplary embodiment, the transition frequency is further dependent on a previously used transition frequency. It would for example be possible to prohibit the transition frequency to change more than a predetermined absolute or relative amount between two consecutive frames. Alternatively, a provisional transition frequency could be inputted as a value into a filter together with previous transition frequencies, giving a modified transition frequency having a more damped change behaviour. The transition frequency will then depend on more than one previous transition frequency.

These routines are typically performed in the transition determining circuitry, i.e. preferably in the quantizing and coding section of the encoder and in the decoder, respectively.

Figure 6:
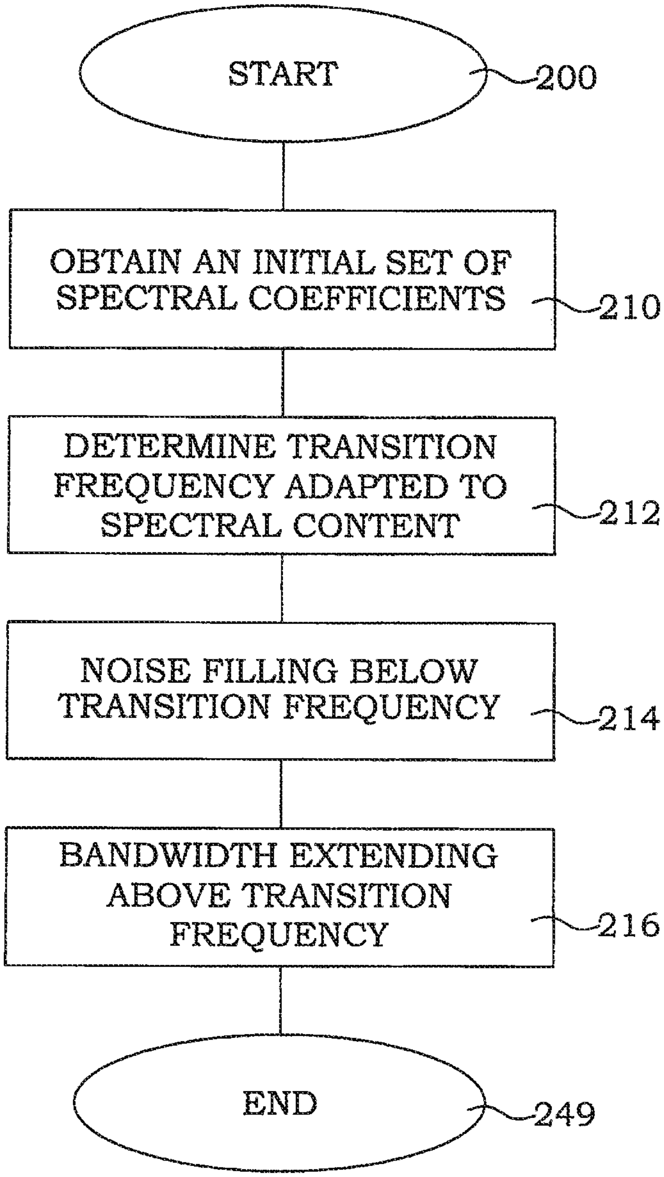
FIG. 6 is a flow diagram of steps of an embodiment of a method according to the present invention.

FIG. 6 is a flow diagram illustrating steps of an embodiment of a method according to the present invention. A method for spectrum recovery in spectral decoding of an audio signal starts in step 200. In step 210, an initial set of spectral coefficients representing the audio signal is obtained. In step 212, a transition frequency is determined. The transition frequency is adapted to a spectral content of the audio signal. Noise filling of spectral holes in the initial set of spectral coefficients below the transition frequency is performed in step 214 and bandwidth extending of the initial set of spectral coefficients above the transition frequency is performed in step 216. The process ends in step 249.

Figure 7:
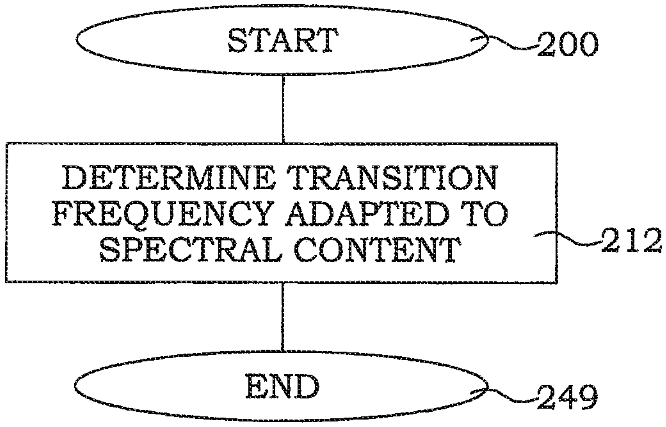
FIG. 7 is a flow diagram of a step of an embodiment of a signal handling method according to the present invention.

Analogously, FIG. 7 is a flow diagram illustrating a step of an embodiment of another method according to the present invention. A method for use in spectral coding of an audio signal begins in step 200. In step 212, a transition frequency is determined. The transition frequency for an initial set of spectral coefficients representing the audio signal is adapted to a spectral content of the audio signal. The transition frequency defining a border between a frequency range, intended to be a subject for noise filling of spectral holes, and a frequency range, intended to be a subject for bandwidth extension.

The present invention acquires a number of advantages by the adaptive definition of the transition frequency according to the used coding scheme. The adapted transition frequency allows the efficient use of a combined spectrum filling using both noise filling and bandwidth extension. Any speech and or audio codec using this method is able to deliver a high-quality and full bandwidth audio signal with annoying artefacts reduced. The method is flexible in the sense it can be combined with any kind of frequency representation (DCT, MDCT, etc.) or filter banks, i.e. with any codec (perceptual, parametric, etc.).

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] 3GPP TS 26.404 V6.0.0 (2004-09), "Enhanced aacPlus general audio codec—encoder SBR part (Release 6)", 2004.

[2] J. D. Johnston, "Estimation of Perceptual Entropy Using Noise Masking Criteria", Proc. ICASSP, pp. 2524-2527, May 1988.

The invention claimed is:

1. A method for processing an audio signal, comprising:

obtaining a first set of quantized coefficients representing at least a portion of the audio signal, wherein each quantized coefficient included in the first set of quantized coefficients is in one frequency band that is included in an ordered set of frequency bands {B(1), . . . , B(N)}, where N>1, each of the frequency bands B(1) to B(N) comprising a plurality of frequencies between an upper frequency of the frequency band and a lower frequency of the frequency band;

determining a transition frequency, wherein the transition frequency divides the set of frequency bands into a first subset of frequency bands and a second subset of frequency bands;

filling holes in the first subset of frequency bands using a first algorithm; and filling holes in the second subset of frequency bands using a second algorithm, wherein determining the transition frequency comprises:

determining whether the number of quantized coefficient within band B(N) is greater than zero; and if the number of quantized coefficient within band B(N) is greater than zero, then determining the transition frequency based on band B(N), otherwise determining the transition frequency based on a band closest in order to band B(N) that has at least one quantized coefficient.

2. The method of claim 1, wherein filling holes in the first subset of frequency bands using the first algorithm comprises noise filling the holes; and filling holes in the second subset of frequency bands using the second algorithm comprises filling holes in the second subset of frequency bands using a bandwidth extension algorithm.

3. The method according to claim 1, wherein the frequency bands have a constant frequency width.

4. The method according to claim 1, wherein at least two of the frequency bands have different frequency widths.

5. The method according to claim 1, wherein the audio signal comprises a set of frames including a first frame and a second frame, the first set of quantized coefficients represent the first frame of the audio signal, and a second set of quantized coefficients represent the second frame of the audio signal.

6. The method according to claim 5, further comprising:

obtaining further quantized coefficients representing only the second frame of the audio signal;

choosing a transition frequency for the further quantized coefficients;

noise filling quantized holes in the further quantized coefficients below the chosen transition frequency; and bandwidth extending the further quantized coefficients above the chosen transition frequency.

7. The method according to claim 6, wherein choosing the transition frequency comprises using a first transition frequency that divides the first subset of bands from the second subset of bands to choose the transition frequency such that the transition frequency is dependent on the first transition frequency.

8. The method according to claim 7, wherein choosing the transition frequency comprises choosing the transition frequency such that the transition frequency is prohibited to change more than a predetermined absolute or relative amount with respect to the first transition frequency.

9. The method of claim 1, further comprising transmitting to a decoder information identifying a first transition frequency that divides the first subset of bands from the second subset of bands.

10. An apparatus for processing an audio signal, the apparatus being configured to perform a process that includes:

obtaining a first set of quantized coefficients representing at least a portion of the audio signal, wherein each quantized coefficient included in the first set of quantized coefficients is in one frequency band that is included in an ordered set of frequency bands {B(1), . . . , B(N)}, where N>1, each of the frequency bands B(1) to B(N) comprising a plurality of frequencies between an upper frequency of the frequency band and a lower frequency of the frequency band;

determining a transition frequency, wherein the transition frequency divides the set of frequency bands into a first subset of frequency bands and a second subset of frequency bands;

filling holes in the first subset of frequency bands using a first algorithm; and filling holes in the second subset of frequency bands using a second algorithm, wherein determining the transition frequency comprises:

determining whether the number of quantized coefficient within band B(N) is greater than zero; and if the number of quantized coefficient within band B(N) is greater than zero, then determining the transition frequency based on band B(N), otherwise determining the transition frequency based on a band closest in order to band B(N) that has at least one quantized coefficient.

11. The apparatus of claim 10, wherein the first algorithm comprises noise filling algorithm; and the second algorithm is a bandwidth extension algorithm.

12. The apparatus according to claim 10, wherein the audio signal comprises a set of frames including a first frame and a second frame, the first set of quantized coefficients represent the first frame of the audio signal, and a second set of quantized coefficients represent the second frame of the audio signal.

13. The apparatus according to claim 12, wherein the apparatus is further configured to:

obtain further quantized coefficients, the further quantized coefficients representing only the second frame of the audio signal;

choose a transition frequency for the further quantized coefficients; and noise fill quantized holes in the further quantized coefficients below the chosen transition frequency.

14. The apparatus according to claim 13, wherein the apparatus is configured to use a first transition frequency to choose the transition frequency, such that the transition frequency is dependent on the first transition frequency.

15. The apparatus according to claim 14, wherein the apparatus is configured to choose the transition frequency such that the transition frequency is prohibited to change more than a predetermined absolute or relative amount with respect to the first transition frequency.

16. The apparatus of claim 11, further comprising a transmitter, wherein the apparatus is configured to employ the transmitter to transmit to a decoder information indicating the first transition frequency.

17. A computer program product comprising a non-transitory computer readable medium storing a computer program that when run on processing circuitry of an audio signal processing apparatus causes the apparatus to perform a method comprising:

obtaining a first set of quantized coefficients representing at least a portion of the audio signal, wherein each quantized coefficient included in the first set of quantized coefficients is in one frequency band included in an ordered set of frequency bands {B(1), . . . , B(N)}, where N>1, each of the frequency bands B(1) to B(N) comprising a plurality of frequencies between an upper frequency of the frequency band and a lower frequency of the frequency band;

determining a transition frequency, wherein the transition frequency divides the set of frequency bands into a first subset of frequency bands and a second subset of frequency bands;

filling holes in the first subset of frequency bands using a first algorithm; and filling holes in the second subset of frequency bands using a second algorithm, wherein determining the transition frequency comprises:

determining whether the number of quantized coefficient within band B(N) is greater than zero; and if the number of quantized coefficient within band B(N) is greater than zero, then determining the transition frequency based on band B(N), otherwise determining the transition frequency based on a band closest in order to band B(N) that has at least one quantized coefficient.

* * * * *